(12) United States Patent
Spaggiari

(10) Patent No.: US 7,108,036 B2
(45) Date of Patent: Sep. 19, 2006

(54) DEVICE FOR MOUNTING AND DISMOUNTING TIRES OF WHEELS POSITIONED ON A WHEEL SUPPORT OF A TIRE CHANGING MACHINE

(75) Inventor: Rino Spaggiari, Reggio Emilia (IT)

(73) Assignee: Snap-On Equipment S.r.l., Reggio Emilia (IT)

( * ) Notice: Subject to any disclaimer, the term of this patent is extended or adjusted under 35 U.S.C. 154(b) by 213 days.

(21) Appl. No.: 10/790,710

(22) Filed: Mar. 3, 2004

(65) Prior Publication Data

US 2004/0182520 A1 Sep. 23, 2004

(30) Foreign Application Priority Data

Mar. 21, 2003 (IT) .................... MO2003A000084

(51) Int. Cl.
*B60C 25/135* (2006.01)
*B60B 30/08* (2006.01)

(52) U.S. Cl. .................... 157/1.24; 157/1.17; 157/14

(58) Field of Classification Search ...... 157/1.22–1.24, 157/1.17, 1.26, 14
See application file for complete search history.

(56) References Cited

U.S. PATENT DOCUMENTS

| 3,086,578 | A | * | 4/1963 | Breazeale et al. | ......... 157/1.24 |
| 3,844,328 | A |   | 10/1974 | Lund |   |
| 6,408,921 | B1 | * | 6/2002 | Bonacini | ................. 157/1.24 |
| 6,619,362 | B1 | * | 9/2003 | Corghi | ..................... 157/1.24 |
| 6,629,554 | B1 | * | 10/2003 | Mimura | ..................... 157/1.24 |
| 2002/0162633 | A1 |   | 11/2002 | Mimura |   |

FOREIGN PATENT DOCUMENTS

| EP | 1 052 120 | 11/2000 |
| EP | 1 177 920 | 2/2002 |

\* cited by examiner

*Primary Examiner*—Hadi Shakeri
(74) *Attorney, Agent, or Firm*—Young & Thompson

(57) ABSTRACT

The device includes a special tool for extracting an upper bead of a tire; the tool is of such a shape and is activated in such a way as to automate the tire dismounting operation reliably and safely. The device comprises other tools, used in the lower bead extraction operation and in the mounting of a tire, which tools are operated using compressed-air actuators which operate tool-bearing arms according to preset trajectories and runs.

20 Claims, 3 Drawing Sheets

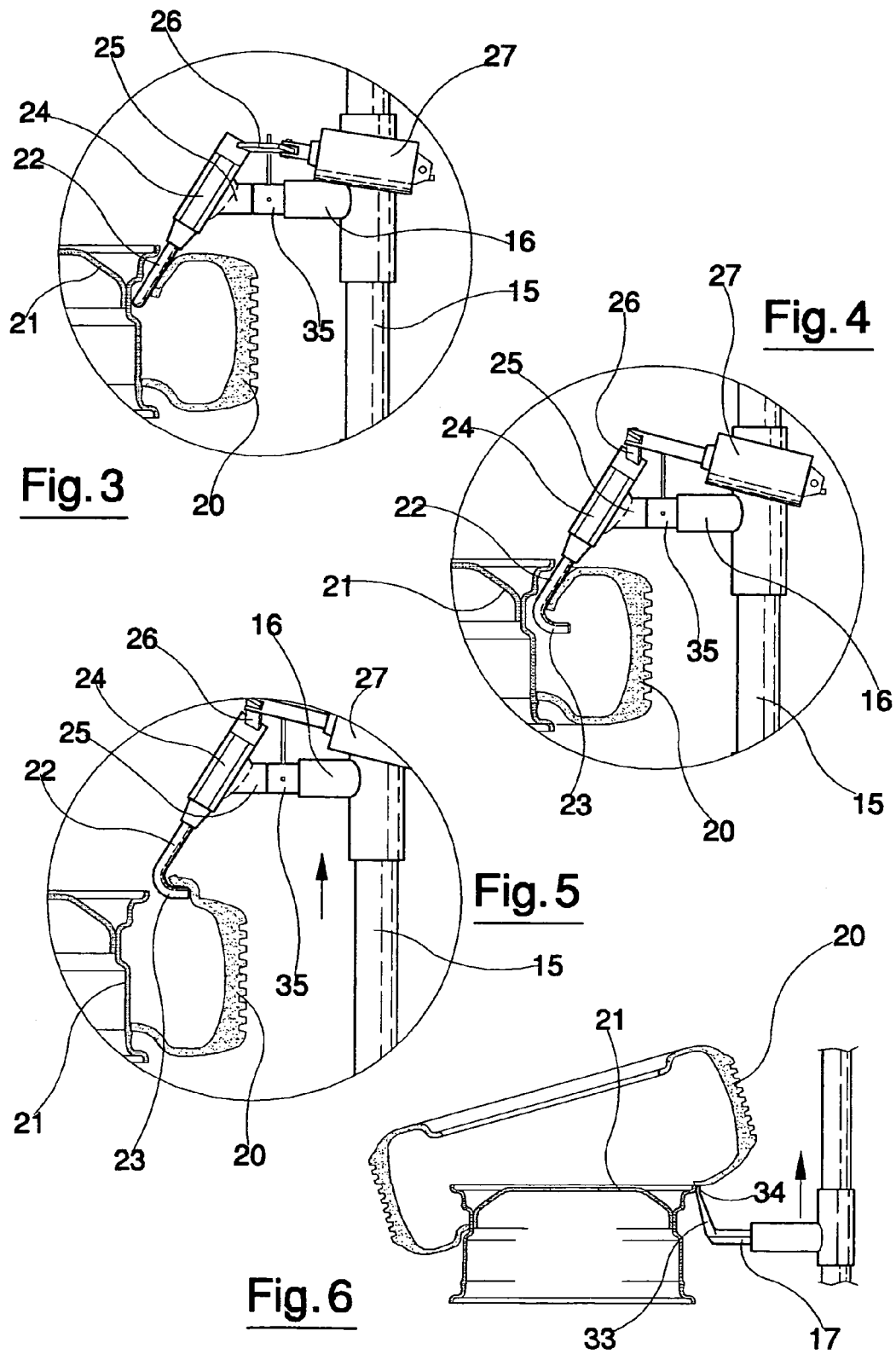

DEVICE FOR MOUNTING AND DISMOUNTING TIRES OF WHEELS POSITIONED ON A WHEEL SUPPORT OF A TIRE CHANGING MACHINE

BACKGROUND OF THE INVENTION

Specifically, though not exclusively, the invention relates to special tools for extracting and mounting tires on wheels positioned on wheel supports of tire-changing machines.

At present, as is known, the dismounting operation, or the mounting operation, of the tire from or on a rim is done using tools and machinery equipped with a horizontal wheel support rotating about a vertical axis thereof, to which a rim of a wheel can be superiorly and self-centringly anchored. Laterally to the wheel support there is a column which supports, in vertically and horizontally adjustable positions, a specially shaped tool, suitable for use in extracting or inserting a bead of a tire from or on the rim.

In particular the tire dismounting operation from the rim takes place after the bead of the tire has been detached from the rim, using special equipment actuated by compressed air and generally located in the lower part of the base of the tire-changing machine, by pressing the bead in a perpendicular direction to the plan of the wheel, towards the inside of the rim; this is called bead-breaking. Once the whole perimeter of the bead has been detached from the wheel rim, the wheel is positioned on the horizontal wheel support and, after having brought the above-mentioned tool close to the wheel, near to the edge of the rim, a lever is inserted between the bead of the tire and the wheel rim, and the bead is extracted from the rim at a point along its circumference, whereafter it is positioned above the above-mentioned tool. At this point, by rotating the wheel support total extraction of the whole upper bead of the tire is completed, taking care to aid the extraction process manually, by exerting a pressure on the side of the tire opposite to the extraction side and by using once more a lever tool, interpositioned between the tire and the rim.

Obviously the above operation requires a considerable physical effort on the part of the operator, which varies according to the dimensions and state of the tire; there is also, obviously, a certain risk of injury in the operator's task. There are similar risks in the tire mounting operation, which is done using the same tools and equipment and by carrying out complementary actions to the ones described above.

Solutions have been proposed to obviate the above drawbacks, which all seek to reduce to a minimum the work needed of the operator. Special attention has been paid to avoiding risky situations such as those which arise when the wheel is rotating about the wheel support.

One of these solutions, for example, is illustrated in Italian industrial patent RE2000A078. This invention includes the use of tools supported on automatically-operating heads, the tools being dedicated, respectively to dis-mounting and to mounting the tire while the tire is rotating on the wheel support of the tire dismounting machine. In particular, the tool dedicated to dismounting the tire is positioned perpendicular to the axis of the head and is pivoted thereto in order to oscillate in a vertical plane passing through the axis, between a position in which it is inclined towards the centre of the rim and a position in which it is inclined in an opposite direction. The first of the above positions favours the hooking of the tool to the bead of the tire while the bead is normally housed in the rim, the second of these positions being used in the extraction operation of the tire from the rim.

The other tool on the machine is a lever positioned on the same head as the first tool, in a diametrically opposite position with respect to the first tool. The lever is used alternatively to the first tool during the mounting of the tire on the rim.

The above machine undoubtedly represents a good solution to the problem to be obviated, as it considerably reduces operator effort during the dismounting and mounting stages of tires from and to rims.

However, in order fully to exploit the advantages of the automatic aspect of the operations, or similar operations, complete reliability of the hooking-up of the extractor tool to the bead of the tire is indispensable; obviously equally indispensable is the reliability of the other operations, such as, for example, the relocating of the bead of the tire in the rim.

The main aim of the present invention is to provide a device for mounting and dismounting the tires in a way which is safe and automatic.

A further aim of the invention is to provide a device for mounting and dismounting tires of wheels positioned on wheel supports of tire-changing machines, in which correct extraction of the upper bead of the tire from the rim of the wheel is guaranteed.

The above aims and others besides are all attained with a device for mounting and dismounting tires of wheels positioned on wheels supports of wheel-mounting and dismounting machines in which groups of tools are supported by horizontal arms arranged superiorly and inferiorly of the wheel support, which tools are vertically translatable with respect to lateral anchoring and support columns, at least one of the groups of tools comprising at least one extractor tool comprising a cylindrical stem with a curved end, rotatably housed in a support seating constrained to one of the arms and actuated in such a way as to cause an introduction of the curved end between the rim and the tire, the other end of the stem being connected to an actuator for causing a rotation of the stem by a more-or-less 90° angle. Following the rotation, the curved end of the tool, once inserted between the rim and the tire, is brought into a hooking position with the bead of the tire, the extraction of the tire being achieved by raising the tool in a preset trajectory and rotating the wheel support.

To improve the efficiency of the tire extraction operation from the rim, the rotation axis of the extractor tool is arranged in a skewed position with respect tot he wheel rotation axis.

The horizontal arm that supports the extractor tool also supports a second tool comprising an appendix, which is curved towards an outside of the wheel, having a rectangular first portion destined to engage with the edge of the tire during the mounting operation, and a second circular portion which is coplanar to the first portion and which is destined to push the edge of the tire internally of the rim during the rotation of the wheel support during mounting. The second tool is constrained to the tool-bearing arm in such a way that when in the rest position it is perpendicular to the extactor tool and is brought into the work position by a more-or-less 90° rotation of the arm.

The wheel support is provided with a blocking self-centring device of the rim, which is thus positioned automatically according to the diameter of the wheel itself. The support arms of the tools, arranged inferiorly and superiorly to the support, are radially aligned with respect to the self-centring device.

A tool-bearing arm, arranged inferiorly of the wheel support, supports an upwards-pointing L-shaped tool which has an upper end that is slightly curved externalwise of the wheel. The tool is translated parallel to the wheel axis at a fixed distance therefrom, more precisely in proximity of the edge of the rim, so as to push the tire in an upwards direction, while the tire is set in rotation, thus completing the dismounting of the tire from the rim after the extraction of the upper bead of the tire. The tool is also used in the lower bead mounting in the wheel rim. This operation is performed by hooking the lower bead to the curved end of the tool and displacing the tool downwards while the wheel support is rotated.

The above brief description evidences the advantages deriving from the mounting and dismounting device, both with regard to the construction simplicity thereof and the rationality of the tools which are part of the device, and with regard to the operational reliability thereof.

SUMMARY OF THE INVENTION

The device includes a special tool for extracting an upper bead of a tire; the tool is of such a shape and is activated in such a way as to automate the tire dismounting operation reliably and safely. The device comprises other tools, used in the lower bead extraction operation and in the mounting of a tire, which tools are operated using compressed-air actuators which operate tool-bearing arms according to preset trajectories and runs.

BRIEF DESCRIPTION OF THE DRAWINGS

Further characteristics and advantages of the present invention will better emerge from the detailed description which follows, of a preferred form of embodiment of the invention, illustrated purely by way of non-limiting example in the accompanying figures of the drawings, in which:

FIGS. 3, 4 and 5 are schematic views relating to special operating configurations of a tool of the device of the invention;

FIGS. 6 and 7 are detailed views relating to special operating configurations of a second tool of the device of the invention;

DESCRIPTION OF THE PREFERRED EMBODIMENTS

Figure 1:
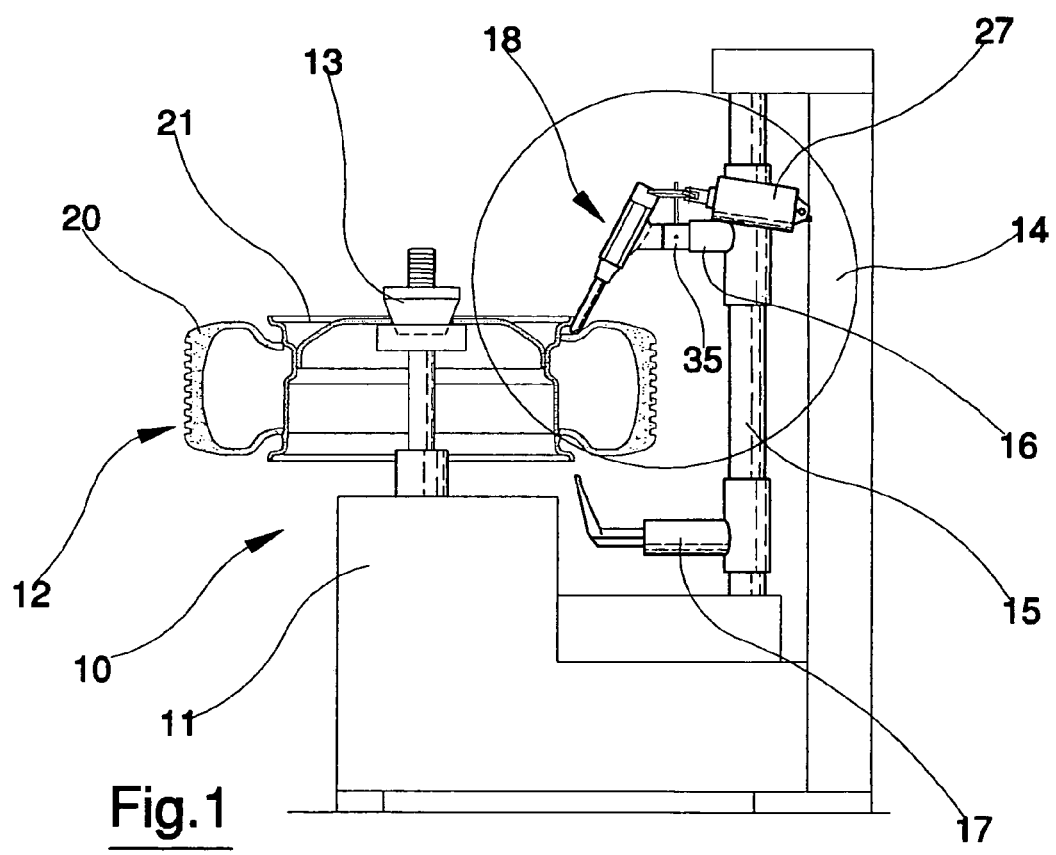
FIG. 1 is an overall perspective view of a tire dismounting machine provided with a device according to the invention.

With reference to FIG. 1 of the drawings, 10 denotes in its entirety a tire dismounting machine comprising a wheel support 11, to which a wheel 12 is constrained by a self-centring device 13, a positioning of which is automatically obtained according to the diameter of the wheel.

The machine comprises a column 14 located laterally to the wheel support 11, which column 14 is provided with a slidable support guide 15 for tool-bearing horizontal arms. In particular, one of the arms 16 is destined to operate in the zone above the wheel support 1, while another arm 17 is destined to operate in the zone below the wheel support 11.

Figure 2:
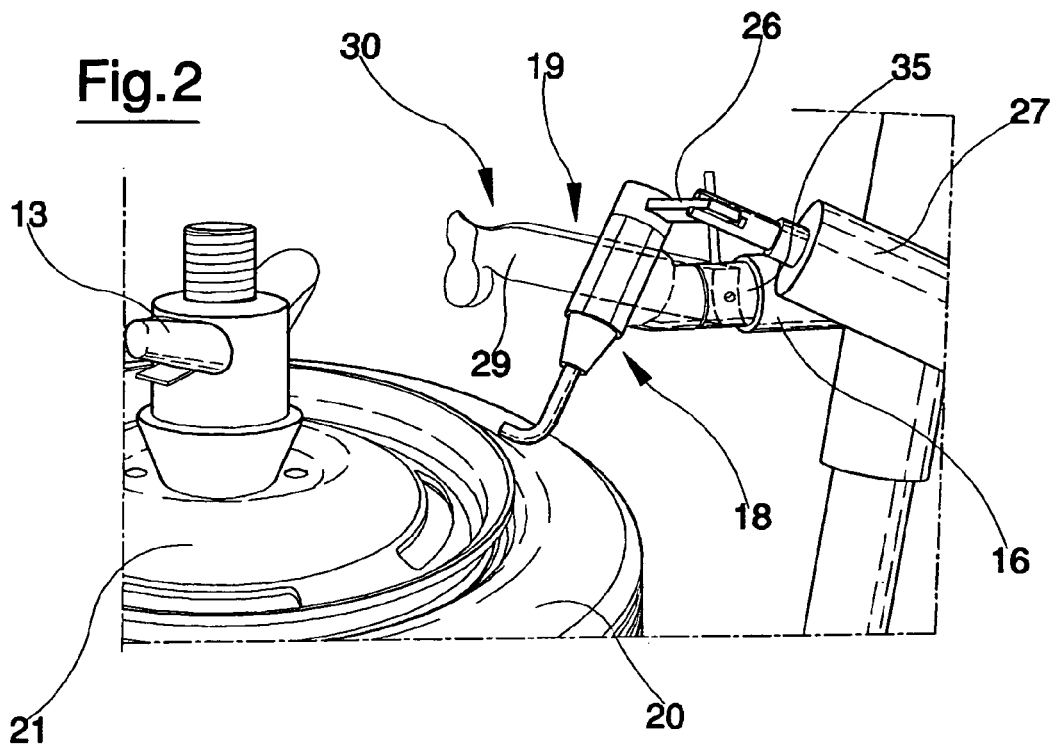
FIG. 2 is a detailed view of a tool group of the device of FIG. 1 in a special operational configuration.

As we can see in FIG. 2, two different tools 18 and 19 are constrained to the upper tool-bearing arm 16. The first tool 18 is for extracting the upper bead of the tire 20 from the rim 21, while the second tool 19 is for mounting the tire in the rim.

The extractor first tool 18 is composed of a cylindrical stem 22, which is provided with a curved end 23 and which is housed, freely rotatable, in a support seating 24, anchored to an end of a pivot 25 arranged internally of the arm 16. Preferably the angle comprised between the curved end 23 and the cylindrical stem 22 is comprised between 45° and 90°. The cylindrical stem 22 of the first tool 18 is connected at an upper end thereof to a con rod mechanism 26 activated by an actuator cylinder 27 to move between two positions, one of which positions is the arrangement of the curved end 23 tangentially to the wheel rim 21, as shown in FIG. 2, while the other position is the arrangement of the curved end 23 perpendicularly to the wheel rim, in a hooking configuration on the bead 28 of the tire, as shown in FIG. 4.

The axis of the first tool 18 is inclined with respect to the wheel axis; the first tool 18 is also not comprised in a plane passing through the wheel axis. This skewed position of the two axes facilitates extraction of the tire from the rim when the curved end 23 of the first tool 18 has hooked onto the bead 28 of the tire.

Figure 8:
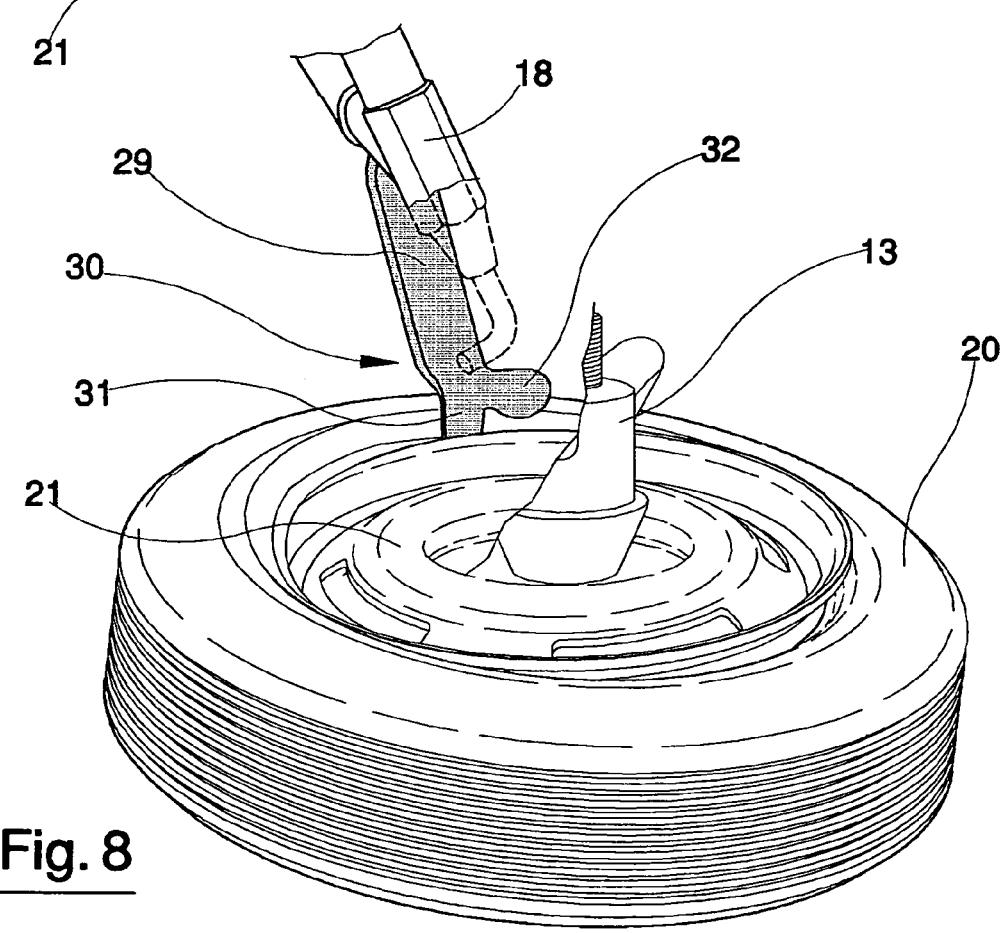
FIG. 8 is a detailed view of the tool group of FIG. 2 in a different operational configuration.

The mounting tool 19 is composed of a lever 29 having a flat section and bearing at an end thereof an appendix 30 which is curved towards an outside of the wheel, the appendix 30 comprising a first rectangular portion 31 and a second circular portion 32, respectively destined to hook the upper bead of the tire when the upper bead is extracted from the rim, and to push the bead towards the inside of the rim while the tire is rotated on the wheel support 11. The mounting tool 19 is brought from the rest position, illustrated in FIG. 2, to the operative position, illustrated in FIG. 8, and back again by rotations of the support sleeve 35 which is rotatable internally of the arm 16.

Figure 7:
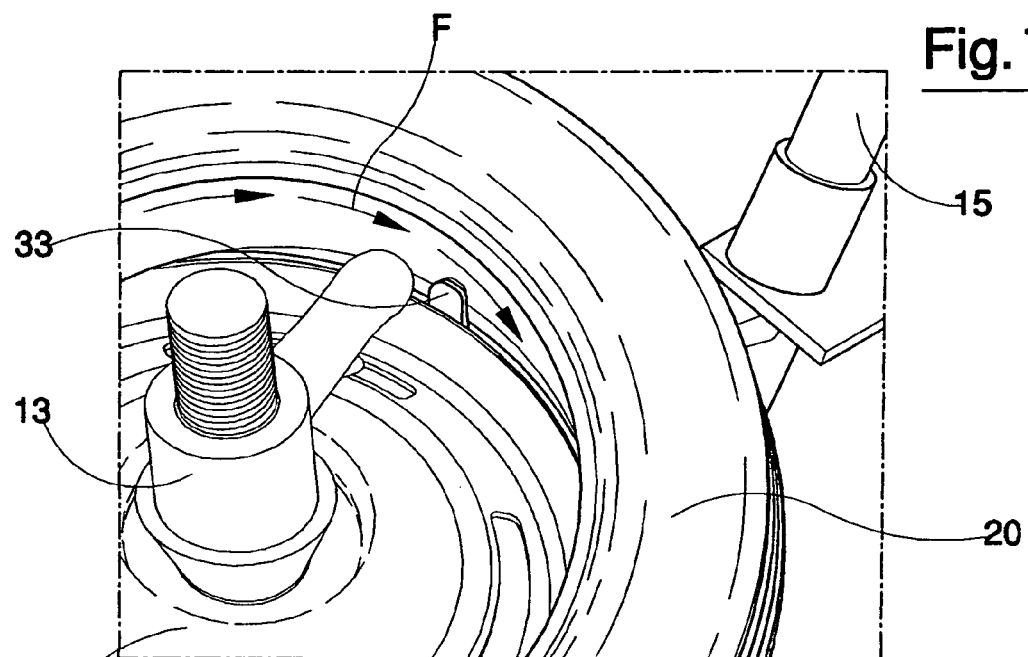

The lower tool-bearing arm 17 supports an L-shaped tool 33, which tool faces upwards and an end of which 34 is slightly curved towards the outside of the wheel. The tool 33 is destined to be translated parallel to the wheel axis, in proximity of the rim 21 edge, both for completing the dismounting of the tire from the rim, pushing the lower bead of the tire above the rim, as illustrated in FIG. 6, and for remounting the lower part of the tire in the rim, by hooking the lower bead with the curved end 34 and dragging the bead downwards while the wheel 12 is rotated on the wheel support 11, as illustrated in FIG. 7.

The functioning of the pneumatic dismounting and mounting device is as follows.

After the wheel 12 has been positioned on the wheel support 11 by automatic centring obtained following the input data provided to the machine 10 according to the diameter of the wheel, and after the bead-breaking operation has been carried out, the upper tool-bearing arm 16 is translated into a position in which the extractor first tool 18 can be arranged in the configuration of FIG. 2 where, as can be seen, the curved end 23 of the tool is tangential to the edge of the rim 21, in a position from which by advancing the tool in the direction of the axis thereof the end can enter between the tire and the rim in the way illustrated in FIG. 3. Advancing the tool 18 in the above-mentioned direction is achieved by combining the vertical translation movement of the arm 16 and the horizontal translation movement of the wheel support 11, which also sets the wheel in rotating motion.

At the moment when the first tool 18 is in the position of FIG. 3, the actuator 27 acting on the con rod mechanism 26 is commanded to rotate the stem of the first tool 18 until the curved end 23 thereof is brought into the hooking position on the tire as illustrated in FIG. 4. At this point the upper bead 28 is extracted from the rim by together actuating the arm 16 and the wheel support 11 in order to obtain, for the curved end, determined trajectories, which among other things guarantee the hooking up between the first tool 18 and the tire during the whole course of the extraction, from the position of FIG. 4 to the position of FIG. 5.

At the end of the extraction of the upper bead 28 of the tire from the rim 21, the upper tool-bearing arm 16 is returned to the rest position after which the lower arm 17 is commanded to translate upwards so that the tool 33 supported thereon extracts the lower bead of the tire from the rim.

The mounting operation of the tire 20 in the rim 21 is done first using the L-shaped tool, to which end 34 of which the lower bead of the tire is hooked, as illustrated in FIG. 7. The tire is made to rotate on the wheel support 11 and drawn downwards by the tool 33, so that the whole lower bead can be inserted in the rim. After this the upper bead 28 of the tire 20 is also inserted, using the mounting tool 19, positioned as in FIG. 8. The rectangular portion 31 of the mounting tool 19 is hooked to the bead 28 of the tire, which tire is rotated in the direction indicated by the arrows F. Following this rotation the bead 28 is automatically inserted in the rim thanks to the action exerted thereon by the circular portion 32 of the tool 19.

The advantage and structural characteristics, as well as the operational advantages of the device of the invention, are evident from the above description, and it is also obvious that these characteristics and advantages are maintained even where modifications and variations are applied to the machine.

For example the reliability of the hooking operation of the bead by the first tool 18 remains the same, thanks to the shape and arrangement of the first tool 18 with respect to the wheel; and this remains the same even if some variations are brought to the device relating to the overall sizes or details of any of its components. The innovative advantages deriving from the automatic aspect both of the tire dismounting operation and the mounting operation also remain the same.

Obviously the shape and dimensions of the tool-bearing arms 16, 17 may change according to the applications; the dimensions and types of the wheel support and the self-centring device could also change.

The actuating means used for the various actuator groups could also change according to the applications, though the speed aspect and the precision aspect would be conserved.

The lever constituting the mounting tool 19 can obviously have a different section from the rectangular section of the illustrated embodiment.

What is claimed:

1. A device for mounting and dismounting tires of wheels positioned on a wheel support of a tire changing machine, in which tool groups are supported and actuated by tool-bearing arms arranged above and below the wheel support and being vertically translatable with respect to lateral columns for anchoring and support, wherein,
at least one of the tool groups comprises at least an extractor first tool comprising a cylindrical stem having a first lower curved end and a second upper end,
the second upper end connected to an actuator mechanism to rotate the stem,
the cylindrical stem is housed rotatably in a support seating,
the support seating constrained to one of the tool-bearing arms, and
the second upper end of the cylindrical stem is actuated by the actuator mechanism in order to rotate the stem and introduce the curved end between a rim and a tire.

2. The device of claim 1, wherein a rotation of the stem is made over an angle which is sufficient to bring the curved edge, once inserted between rim and tire, into a hooking position with a bead of the tire.

3. The device of claim 2, wherein an axis of rotation of the stem of the extractor first tool is arranged in a skewed position with respect to an axis of rotation of the wheel.

4. The device of claim 3, wherein at least one of the tool groups comprises a second tool comprising a lever with an appendix at an end thereof, which appendix is curved towards an outside of the wheel, and which is provided with a rectangular first portion destined to engage with the bead during a mounting operation, and a circular second portion which is coplanar to the rectangular first portion and destined to push the bead towards an inside area of the rim while the tire is rotated by the wheel support.

5. The device of claim 3, wherein the wheel support is provided with a self-centring blocking device of the rim, a positioning thereof being automatically obtained according to a diameter of the wheel, the tool-bearing arms arranged below and above the wheel support being radially aligned with respect to the selfcentring device.

6. The device of claim 3, wherein the tool-bearing arm arranged below the wheel support supports an upwards-directed L-shaped tool having an upper end which is slightly curved towards an outside of the wheel, the L-shaped tool being translated parallel to an axis of the wheel in proximity of an edge of the rim.

7. The device of claim 2, wherein at least one of the tool groups comprises a second tool comprising a lever with an appendix at an end thereof, which appendix is curved towards an outside of the wheel, and which is provided with a rectangular first portion destined to engage with the bead during a mounting operation, and a circular second portion which is coplanar to the rectangular first portion and destined to push the bead towards an inside area of the rim while the tire is rotated by the wheel support.

8. The device of claim 2, wherein the wheel support is provided with a self-centring blocking device of the rim, a positioning thereof being automatically obtained according to a diameter of the wheel, the tool-bearing arms arranged below and above the wheel support being radially aligned with respect to the selfcentring device.

9. The device of claim 2, wherein the tool-bearing arm arranged below the wheel support supports an upwards-directed L-shaped tool having an upper end which is slightly curved towards an outside of the wheel, the L-shaped tool being translated parallel to an axis of the wheel in proximity of an edge of the rim.

10. The device of claim 1, wherein the wheel support is provided with a self-centring blocking device of the rim, a positioning thereof being automatically obtained according to a diameter of the wheel, the tool-bearing arms arranged below and above the wheel support being radially aligned with respect to the self-centring device.

11. The device of claim 10, wherein the tool-bearing arm arranged below the wheel support supports an upwardsdirected L-shaped tool having an upper end which is slightly curved towards an outside of the wheel, the L-shaped tool being translated parallel to an axis of the wheel in proximity of an edge of the rim.

12. The device of claim 1, wherein the tool-bearing arm arranged below the wheel support supports an upwardsdirected Lshaped tool having an upper end which is slightly curved towards an outside of the wheel, the L-shaped tool being translated parallel to an axis of the wheel in proximity of an edge of the rim.

13. The device of claim 12, wherein the L-shaped tool is used to push the tire upwards while rotating, so that a dismounting operation thereof from the rim is completed after extraction of the upper bead, the L-shaped tool being used in a mounting operation of a lower bead of the tire internally of the rim, by hooking the lower bead with the curved upper end and displacing the lower bead downwards while the wheel support is rotated.

14. A device for mounting and dismounting tires of wheels positioned on a wheel support of a tire changing machine, in which tool groups are supported and actuated by tool-bearing arms arranged above and below the wheel support and being vertically translatable with respect to lateral columns for anchoring and support, wherein at least one of the tool groups comprises at least an extractor first tool comprising a cylindrical stem having a curved end which cylindrical stem is housed rotatably in a support seating constrained to one of the tool-bearing arms and is actuated in order to introduce the curved end between a rim and a tire, another end of the stem being connected to an actuator for rotating the stem, wherein at least one of the tool groups comprises a second tool comprising a lever with an appendix at an end thereof, which appendix is curved towards an outside of the wheel, and which is provided with a rectangular first portion destined to engage with the bead during a mounting operation, and a circular second portion which is coplanar to the rectangular first portion and destined to push the bead towards an inside area of the rim while the tire is rotated by the wheel support.

15. The device of claim 14, wherein the wheel support is provided with a self-centring blocking device of the rim, a positioning thereof being automatically obtained according to a diameter of the wheel, the tool-bearing arms arranged below and above the wheel support being radially aligned with respect to the selfcentring device.

16. The device of claim 14, wherein the tool-bearing arm arranged below the wheel support supports an upwardsdirected L-shaped tool having an upper end which is slightly curved towards an outside of the wheel, the L-shaped tool being translated parallel to an axis of the wheel in proximity of an edge of the rim.

17. A device for mounting and dismounting tires of wheels positioned on a wheel support of a tire changing machine, comprising:
   a wheel support;
   a tool-bearing arm with a pivot;
   a column supporting the arm so that the arm is vertically translatable with respect to the column;
   a support seating anchored at a free end of the pivot of the arm;
   an actuator for rotating the stem; and
   a first extractor tool comprising a cylindrical stem housed, freely rotatable, in the support seating,
   the cylindrical stem having a first curved end and a second upper end connected to the actuator,
   the actuator actuating the stem to rotate the stem within the support seating and thereby introduce the first curved end between a rim and a tire.

18. The device of claim 17, wherein, the stem is actuated between a first position with the curved end tangentially to the wheel rim and a second position with the curved end perpendicular to the wheel rim, in a hooking configuration on the bead of the tire.

19. The device of claim 18, wherein,
   an axis of the first extractor tool is inclined with respect to the wheel axis and the first extractor tool is free of a plane passing through the wheel axis,
   the actuator comprises a con rod mechanism,
   the second upper end of the stem is connected to the con rod mechanism, and
   the pivot is arranged internally of the arm.

20. The device of claim 17, further comprising a second tool comprising a lever with i) an appendix at an end thereof curved towards an outside of the wheel, ii) a rectangular first portion destined to engage with the bead during a mounting operation, and iii) a circular second portion which is coplanar to the rectangular first portion and destined to push the bead towards an inside area of the rim while the tire is rotated by the wheel support.

* * * * *